Dec. 30, 1941.  H. KEIL  2,268,337
STRAP SEAL JOINT
Filed June 24, 1940
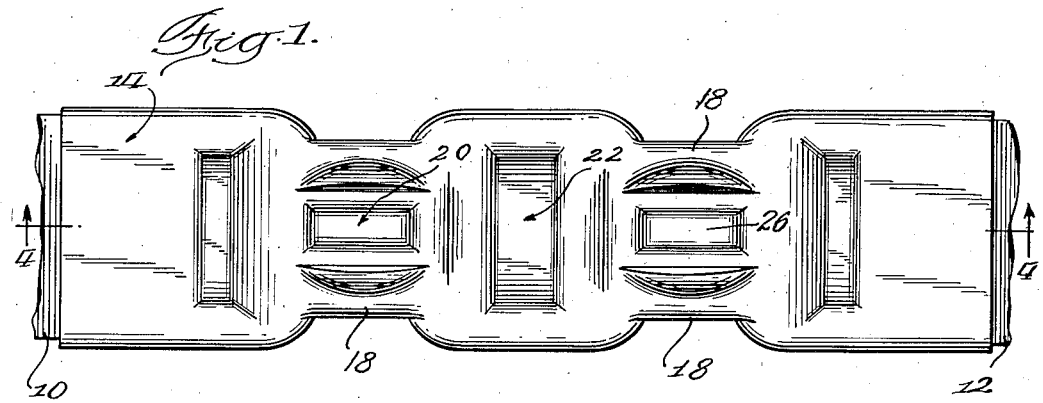
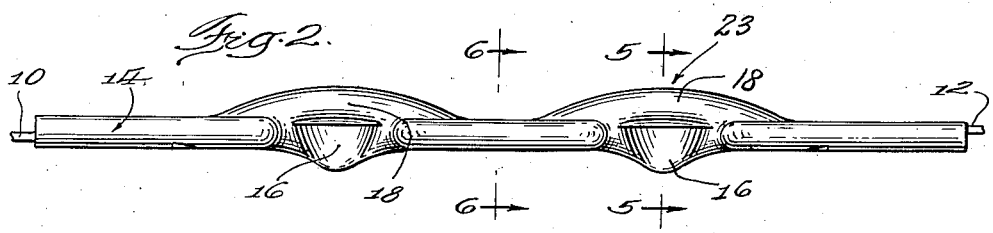
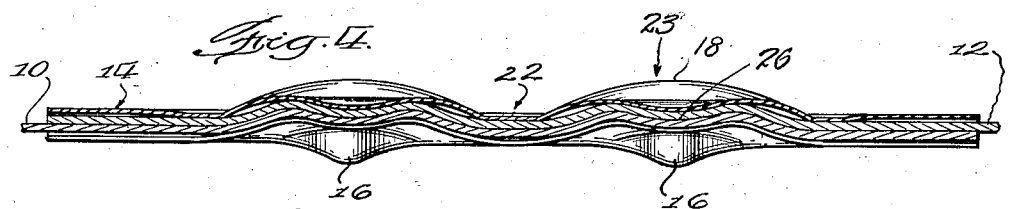
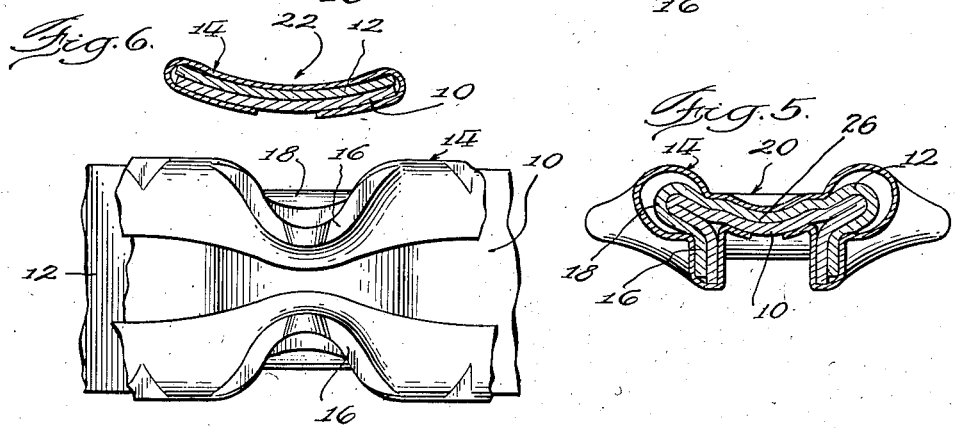
Inventor:
Henry Keil
By
Williams, Bradbury, & Hinkle
Attys.

Patented Dec. 30, 1941

2,268,337

UNITED STATES PATENT OFFICE 2,268,337

STRAP SEAL JOINT

Henry Keil, Chicago, Ill., assignor to Signode Steel Strapping Company, Chicago, Ill., a corporation of Delaware Application June 24, 1940, Serial No. 342,055

8 Claims. (Cl. 24—23)

This invention relates to strap seal joints.

More particularly, it relates to strap seal joints for interconnecting overlapped portions of binding straps, which joints are made by a continuous edgewise crimping action with a suitable tool to form in the strap complementary interlocking separation-resisting distortions.

The present seal is of the general type of seals disclosed in the Flora Patent No. 1,252,680, and the Porter Patent No. 1,969,152 which was an improvement over the Flora joint. The present joint is an improvement over these earlier seals, however, particularly in that the present seal provides approximately 15% greater joint strength than that disclosed in the abovementioned Porter patent and requires no greater effort to form.

The Porter type joint, although considerably stronger than the Flora joint, is not as strong as the joint of the present invention, partially because the contact between the overlapped strap across the top of the hump in the Porter joint does not resist lateral stresses to as great an extent as does the joint of my invention. That is, each of the side flanges of the Porter joint owes its ability to resist tensional stresses largely because the similar side flange on the opposite side of the joint inhibits lateral movement between the upper and lower straps. Also, the Porter joint was susceptible to collapse longitudinally of the hump under strong tension, with an accompanying weakening effect on the joint.

The seal of the present invention overcomes these weaknesses and disadvantages of the earlier joints, as will be described in detail later.

One of the objects of my invention is to provide an improved joint for joining overlapped portions of metal binding straps, which may be used with or without an encircling sleeve.

Another object is to provide an improved joint which is stronger than the joints previously mentioned and which can be formed by portable manually operated tools of feasible size.

Another object of my invention is to provide a novel strap joint that will not collapse longitudinally of the hump.

Other objects and advantages will become apparent hereafter in the description of my invention.

In the drawing, in which similar characters of reference refer to similar elements throughout the several views:

Fig. 1 is a plan view of a tandem related pair of seal joints embodying my invention;

Fig. 2 is a side elevation thereof;

Fig. 3 is an inverted plan view of one of the joints shown in Figs. 1 and 2;

Fig. 4 is a longitudinal sectional view which may be considered as taken in the direction of the arrows, along the line 4—4 of Fig. 1;

Fig. 5 is a transverse sectional view through one joint, taken in the direction indicated by the arrows along the line 5—5 of Fig. 2;

Fig. 6 is a transverse sectional view through the portion of the strap between the joints and is taken in the direction of the arrows along the line 6—6 of Fig. 2.

Referring to the drawing, the joint is made between overlapping portions 10 and 12 of a flat metal binding strap and an encircling sleeve 14 by deforming the strap and sleeve with a suitable tool. The sleeve may be of the type shown in Flora Patent No. 1,252,680 or Leslie Patent No. 1,445,330, while a tool generally similar to that shown in Porter Patent 1,952,092 may be used for forming the deformations.

Each of the joints is formed by bending downwardly and inwardly toward the center the opposite edge portions of the overlapped straps to form curved marginal upstanding flanges 16. These marginal flanges 16 are formed substantially normal to the original plane of the strap and curve continuously relative to either the length or breadth of the strap. The central portions of the flanges 16 are concave toward each other, while the flanges at their ends are curved convexly and merge into the straight marginal edges of the contiguous portions of the strap.

The marginal upstanding flanges are deformed to lie inwardly beneath the body of the strap, so that the layers of metal in the overlapped portions are folded back tightly upon themselves into compact longitudinally extending ribs 18 at each edge of the joint. These ribs overlie the marginal flanges 16 and are separated from each other by a longitudinally extending depression or crease 20 formed in the top of the joint. The forming of this depression 20 crowds the metal in the ribs 18 outwardly and downwardly, while the simultaneous formation of the marginal flanges 16 forces the metal in the ribs 18 upwardly and inwardly. The simultaneous opposing forces thus brought about in the formation of the ribs 18 wedge the metal in the overlapped portions of the strap into extremely close engagement with each other without the formation of any such sharp bends that commercial strap might be fractured or that would require forming pressure beyond the limits of easily portable manually actuated tools.

The portion of the strap longitudinally adjacent the joint just described is slightly curved concavely at 22 as seen from the top of the joint, in a direction transverse to the strap axis. This concave curvature is oppositely disposed to the general direction of curvature of the strap in the hump portion 23, raised by the formation of the ribs 18 of the joint. The gradual merging of these two opposite curvatures holds the overlapped straps in close frictional contact and materially aids in tension-resisting ability of the joint as a whole. This is particularly true when the joint is of the sleeve type and when two joints are formed in tandem.

The inward curvature of the vertical marginal flanges 16 provides opposite abutting shoulders disposed obliquely to the line of tension in the strap. These curved vertical flanges are supported against being straightened out or rolled outwardly by the overlying ribs 18. The ribs are in turn supported by the flanges and by the shoulders formed at the edges of the central longitudinal depression or crease 20 which provides a horizontal reinforcing strut 26 extending crosswise between the ribs 18, thus bracing the ribs against collapsing laterally toward each other.

The placement of the strut 26 considerably below the level of the top of the hump has the additional advantageous effect of bringing the central line of the joint more nearly into the plane of the flat portion of the strap and thus overcomes the tendency of the prior humps to collapse downwardly in the center under strong tension. That is, in prior joints, such as that shown in Porter Patent No. 1,969,152, strong tension caused the humps to collapse longitudinally in the center; this, in turn, tilted the flanges outwardly and enabled the ribs to unroll. By the placement of the strut downwardly almost to the plane of the strap, no considerable additional downward movement of this member can occur even under tension sufficiently great to cause rupture of the strap.

With this joint, the tendency common in earlier joints for successive failure of the several interlocking features does not occur. Thus, though strong tension will tend to roll the vertical flanges 16 outwardly, it will also tend to roll the ribs 18 downwardly, since they form a hump which tends to flatten with tension, because the hump is above the plane in which the tensional forces are acting. The outward movement of the flanges it will be seen is incompatible with the downward movement of the ribs and consequently the portion of the straps in the ribs and flanges will be bound even more tightly together.

With two points in tandem, as shown in Figs. 1, 2 and 4, the tensional strain will be evenly distributed throughout both joints and there will be no tendency for the joints to pull out successively. All portions of the overlapping straps are wedged tightly together in the joints themselves, while the slight reverse transverse curvature at 22 stiffens the section between the joints and binds the straps tightly together in frictional engagement at this intermediate point which, in earlier strap joints, contributed nothing substantial to the joint strength.

Because all of the interrelated elements in the present joint force the overlapped strap ends into tight frictional engagement instead of merely providing interengaging shoulders, strong joints can be made in straps having a low coefficient of friction, such as lubricated strap. This is an advantageous feature, since lubricated straps are often desirable since they slide more easily around the corners and over the surface of the packages or loads being strapped during the tensioning operation.

It will be appreciated also that the formation of the flanges beneath the ribs prevents separation of the overlapped strap ends in a direction normal to the plane of the strap and thus makes this joint available for use without the encircling sleeve, although some joint strength will necessarily be sacrificed if no sleeve is used.

Having thus described the nature of my invention, what I claim as new and useful and desire to secure by United States Letters Patent is:

1. A strap joint comprising overlapped portions of metal strap deformed to provide complementary obliquely related upstanding marginal flanges and compactly rolled marginal ribs, the ribs and flanges being substantially coextensive longitudinally of the strap and mutually reinforcing each other to prevent tension in the straps lessening the obliquity of the flanges, and a strut extending crosswise of the strap between the marginal ribs and flanges and spaced downwardly below the tops of the marginal ribs.

2. A strap joint comprising overlapped portions of metal strap deformed to provide complementary obliquely related upstanding marginal flanges and compactly rolled marginal ribs, the ribs and flanges being substantially coextensive longitudinally of the strap and mutually reinforcing each other to prevent tension in the straps lessening the obliquity of the flanges, and a strut extending crosswise of the strap between the marginal ribs and flanges and spaced downwardly below the tops of the marginal ribs and substantially opposite the marginal flanges.

3. A strap joint comprising overlapped portions of metal strap encircled by a metal sleeve, said strap and sleeve being deformed to provide complementary obliquely related upstanding marginal flanges and compactly rolled marginal ribs, the ribs and flanges being substantially coextensive longitudinally of the strap and mutually reinforcing each other to prevent tension in the straps lessening the obliquity of the flanges, and a strut extending crosswise of the strap between the marginal ribs and flanges and spaced downwardly below the tops of the marginal ribs.

4. A strap joint comprising overlapped portions of metal strap encircled by a metal sleeve, said strap and sleeve being deformed to provide complementary obliquely related upstanding marginal flanges and compactly rolled marginal ribs, the ribs and flanges being substantially coextensive longitudinally of the strap and mutually reinforcing each other to prevent tension in the straps lessening the obliquity of the flanges, and a strut extending crosswise of the strap between the marginal ribs and flanges and spaced downwardly below the tops of the marginal ribs and substantially opposite the marginal flanges.

5. A strap joint comprising overlapped portions of metal strap, said overlapped portions being deformed to provide oblique upstanding marginal flanges and compactly rolled marginal ribs, the ribs extending substantially coextensive longitudinally with the flanges, said flanges having the major portion thereof lying directly below said ribs, a hump offset from the normal plane of the strap, and said hump having a crease extending longitudinally of the strap with the plane of the crease lying below the plane of the ribs.

6. A strap joint comprising overlapped portions of metal strap, said overlapped portions being deformed to provide oblique upstanding marginal flanges and compactly rolled marginal ribs, the ribs extending substantially coextensive longitudinally with the flanges, said flanges having the major portion thereof lying directly below said ribs, a hump offset from the normal plane of the strap, and said hump having a crease extending longitudinally of the strap with the plane of the crease lying below the plane of the ribs and substantially opposite the flanges.

7. A strap joint comprising overlapped portions of metal strap, a metal sleeve encircling said overlapped portions, said overlapped portions and encircling sleeve being deformed to provide oblique upstanding marginal flanges and compactly rolled marginal ribs, the ribs extending substantially coextensive longitudinally with the flanges, said flanges having the major portion thereof lying directly below said ribs, a hump offset from the normal plane of the strap, and said hump having a crease extending longitudinally of the strap with the plane of the crease lying below the plane of the ribs.

8. A strap joint comprising a pair of mutually supporting individual joint elements in contiguous tandem arrangement, each of said individual joint elements comprising deformations of the overlapped strap material to form interengaging flanges and offset humps with both of said humps being offset in the same direction, and the portion of said joint between said individual joint elements being curved transversely in a direction opposite to the direction of curvature of said humps.

HENRY KEIL.